United States Patent [19]

Kusakabe

[11] Patent Number: 5,165,026
[45] Date of Patent: Nov. 17, 1992

[54] PROGRAMMABLE CONTROLLER IN WHICH FETCHING OF OPERAND DATA AND FETCHING OF OPERAND ADDRESSES ARE SIMULTANEOUSLY PERFORMED

[75] Inventor: Hiroyuki Kusakabe, Tokyo, Japan

[73] Assignee: Kabushiki Kaisha Toshiba, Kawasaki, Japan

[21] Appl. No.: 417,039

[22] Filed: Oct. 4, 1989

[30] Foreign Application Priority Data

Oct. 5, 1988 [JP] Japan ............... 63-249843

[51] Int. Cl.⁵ .................................... G06F 13/00
[52] U.S. Cl. ........................... 395/375; 364/DIG. 1; 364/187; 364/132; 364/133; 364/136; 364/243; 364/243.3; 395/425
[58] Field of Search ... 364/200 MS File, 900 MS File, 364/132-136, 187; 395/375, 425

[56] References Cited

U.S. PATENT DOCUMENTS

| | | | |
|---|---|---|---|
| 4,200,936 | 4/1980 | Borzcik et al. | 364/900 |
| 4,504,927 | 3/1985 | Callan | 364/900 |
| 4,608,661 | 8/1986 | Sasaki | 364/900 |
| 4,648,068 | 3/1987 | Ninnemann et al. | 364/900 |
| 4,663,730 | 5/1987 | Ikeda | 364/900 |
| 4,700,292 | 10/1987 | Campanini | 364/200 |
| 4,882,702 | 11/1989 | Struger et al. | 364/900 |

*Primary Examiner*—Thomas C. Lee
*Assistant Examiner*—Mehmet Geckil
*Attorney, Agent, or Firm*—Oblon, Spivak, McClelland, Maier & Neustadt

[57] ABSTRACT

A program memory and a data memory are independently arranged, and a holding register is arranged between the program memory and the data memory. The program memory and the holding register, the holding register and the data memory, and the data memory, a bit computation unit, and a numerical computation unit are respectively connected to each other through independent buses. After an operand address output from the program memory is latched by the holding register, the content of an instruction pointer for the program memory is updated. As a result, since an operand of the next instruction is set in a register file upon completion of execution of the first instruction, a processing speed can be increased.

8 Claims, 9 Drawing Sheets

F I G. 1 (PRIOR ART)

|  | 1A | 1B |
|---|---|---|
|  | INSTRUCTION 1 | OPERAND 1 |
|  | INSTRUCTION 2 | OPERAND 2 |
|  | INSTRUCTION 3 | OPERAND 3 |
|  | ⋮ | ⋮ |
|  | INSTRUCTION N | OPERAND N |

F I G. 2 (PRIOR ART)

| ADDRESS | | |
|---|---|---|
| n | NUMERICAL COMPUTATION INSTRUCTION CODE | INSTRUCTION TYPE |
| n + 1 | OPERAND INSTRUCTION CODE | OPERAND A ADDRESS |
| n + 2 | OPERAND INSTRUCTION CODE | OPERAND B ADDRESS |
| n + 3 | OPERAND INSTRUCTION CODE | OPERAND C ADDRESS |

| ADDRESS | | |
|---|---|---|
| 1 | ID1 (BIT COMPUTATION INSTRUCTION CODE) | OP1 (OPERAND ADDRESS OA1) |
| 2 | ID2 (BIT COMPUTATION INSTRUCTION CODE) | OP2 (OPERAND ADDRESS OA2) |
| 3 | ID3 (NUMERICAL COMPUTATION INSTRUCTION CODE) | OP3 (INSTRUCTION TYPE) |
| 4 | ID4 (OPERAND INSTRUCTION CODE) | OP4 (OPERAND ADDRESS OA4) |
| 5 | ID5 (OPERAND INSTRUCTION CODE) | OP5 (OPERAND ADDRESS OA5) |
| 6 | ID6 (OPERAND INSTRUCTION CODE) | OP6 (OPERAND ADDRESS OA6) |
| 7 | ID7 (BIT COMPUTATION INSTRUCTION CODE) | OP7 (OPERAND ADDRESS OA7) |
| 8 | ID8 (BIT COMPUTATION INSTRUCTION CODE) | OP8 (OPERAND ADDRESS OA8) |
| 9 | ID9 (BIT COMPUTATION INSTRUCTION CODE) | OP9 (OPERAND ADDRESS OA9) |
| 10 | ID10 (BIT COMPUTATION INSTRUCTION CODE) | OP10 (OPERAND ADDRESS OA10) |
| 11 | ID11 (BIT COMPUTATION INSTRUCTION CODE) | OP11 (OPERAND ADDRESS OA11) |
| 12 | | |

PROGRAMMABLE CONTROLLER IN WHICH FETCHING OF OPERAND DATA AND FETCHING OF OPERAND ADDRESSES ARE SIMULTANEOUSLY PERFORMED

BACKGROUND OF THE INVENTION

1. Field of the Invention

The present invention relates to a programmable controller for executing a sequence instruction comprising a bit computation instruction, numerical computation instruction, or the like at high speed.

2. Description of the Related Art

Figure 1:
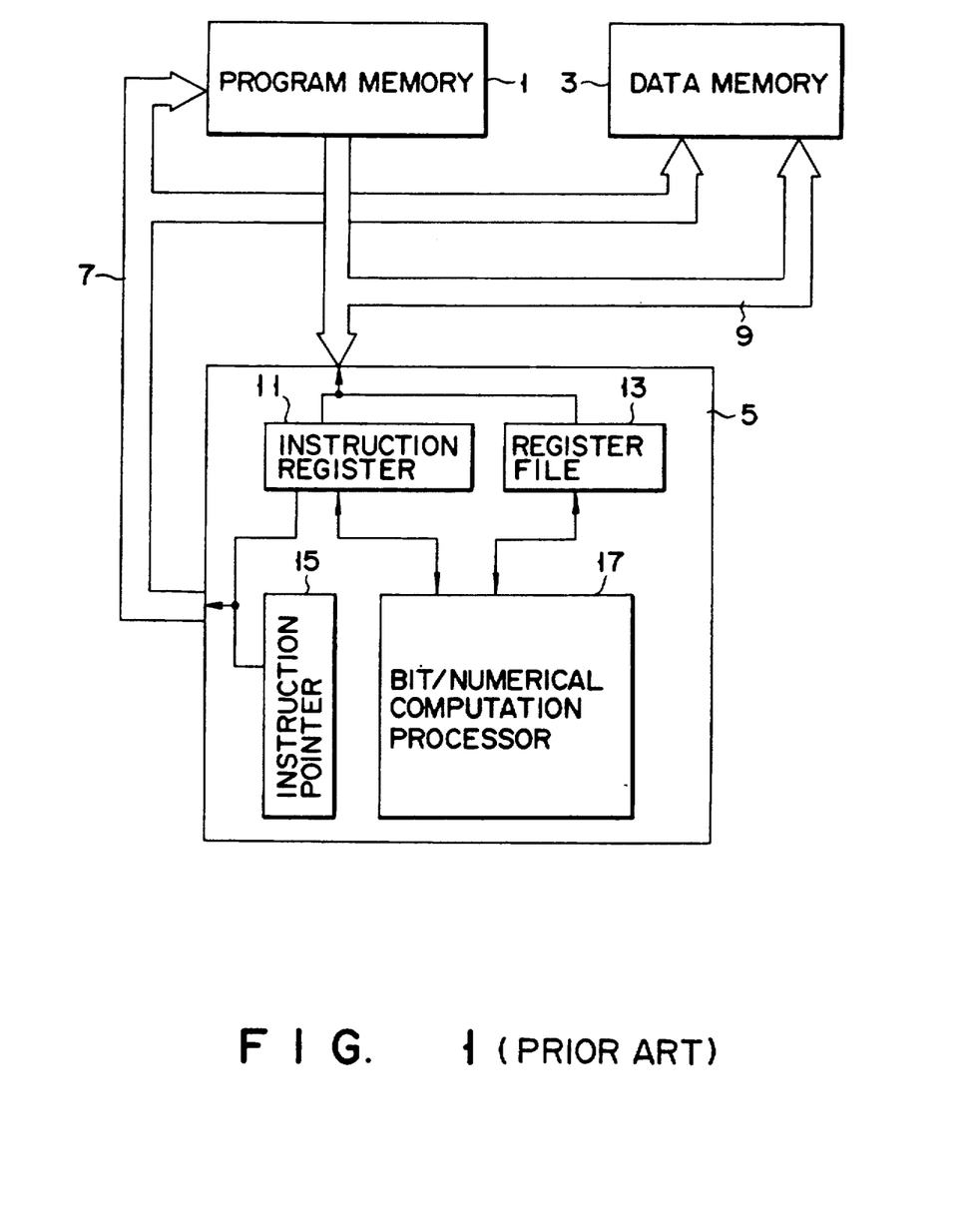
FIG. 1 is a block diagram of a conventional programmable controller.

FIG. 1 is a block diagram showing a conventional programmable controller. In FIG. 1, a program memory 1, a data memory 3, and a sequence execution control unit 5 are connected to a common address bus 7 and a data bus 9. As shown in FIG. 2, the program memory 1 stores sequence instructions each comprising an instruction field 1A and an operand field 1B. The data memory 3 stores computation data of process I/O data, an internal output, and the like. The sequence execution control unit 5 executes a sequence computation, e.g., a bit computation or numerical computation on the basis of the instruction field fetched from the program memory 1 and computation data from the data memory 3.

Each numerical computation instruction is constituted by a word comprising a numerical computation instruction code and an instruction type, and words comprising operand instruction codes and operand addresses, as shown in FIG. 3. The sequence execution control unit 5 comprises an instruction register 11 for holding sequence instructions (numerical computation instruction, bit computation instruction, and the like) fetched from the program memory 1, a data register file 13 for holding operands read out from the data memory 3, an instruction pointer 15 for supplying a location address to the program memory 1 and the data memory 3, and a bit/numerical computation processor 17. The bit/numerical computation processor 17 supplies a location address for the program memory 1 held in the instruction pointer 15 to the program memory 1. Assume that the instruction pointer 15 stores an address "n", as shown in FIG. 3. The program memory 1 outputs a corresponding sequence instruction to the instruction register 11 through the data bus 9 in response to the input location address "n". As a result, as shown in FIG. 3, the numerical computation instruction code and the instruction type are held in the instruction register 11. The numerical computation instruction code indicates that the sequence command is a numerical computation instruction. When the sequence instruction code indicates a bit computation instruction, a bit computation instruction code is stored in the program memory 1 in place of the numerical computation instruction code. The instruction type indicates the type of instruction (e.g., addition, subtraction, or the like) of numerical computation instructions. The bit/numerical computation processor 17 detects the numerical computation instruction code and the computation type by decoding the content held in the register 11. The bit/numerical computation processor 17 then increments the instruction pointer 15 by "1" to supply an address "n+1" to the program memory 1. As a result, the program memory 1 outputs an operand instruction code and an operand A address to the instruction register 11. Therefore, the bit/numerical computation processor 17 detects by decoding that the content of the instruction register 11 is operand data, and supplies the operand A address to the data memory 3 through the address bus 7. The data memory 3 outputs the content at a location corresponding to the operand A address to the register file 13.

Figure 4A:
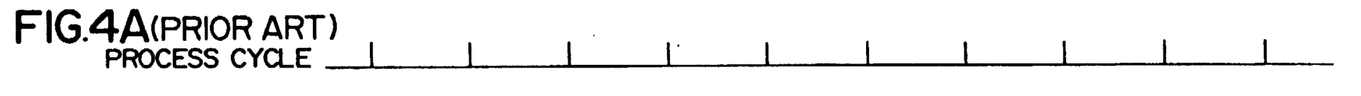
FIG. 4A shows a conventional process clock cycle for the programmable controller illustrated in FIG. 1.
Figure 4B:
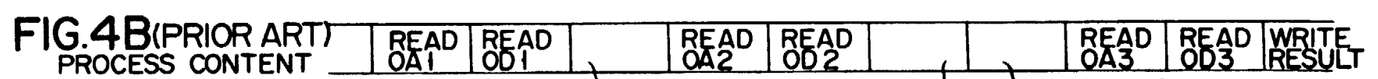
FIG. 4B shows a conventional process content for data values of operand data and operand addresses for the programmable controller of FIG. 1.
Figure 4C:
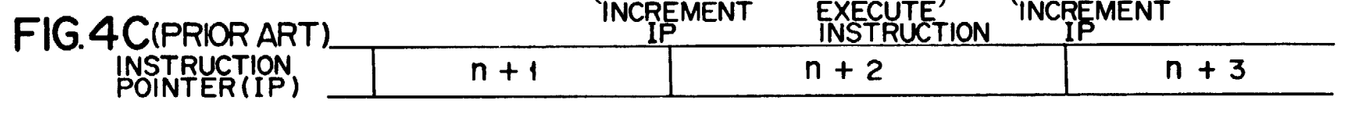
FIG. 4C shows a corresponding conventional timing chart for the update of an instruction point for the controller of FIG. 1.
Figure 4D:
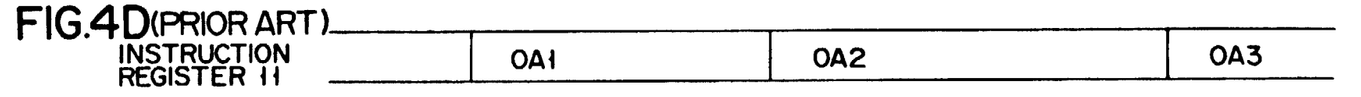
FIG. 4D shows the corresponding conventional instruction register as updated with successive operand addresses.
Figure 4E:
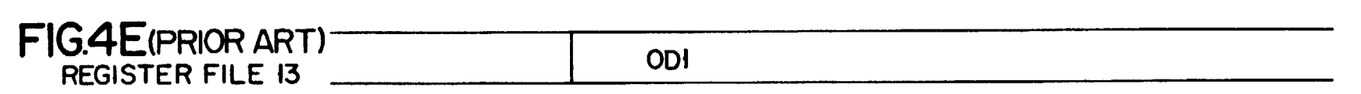
FIG. 4E illustrates the operand data content status of the register file in FIG. 1 having a first operand data value stored therein.
Figure 4F:
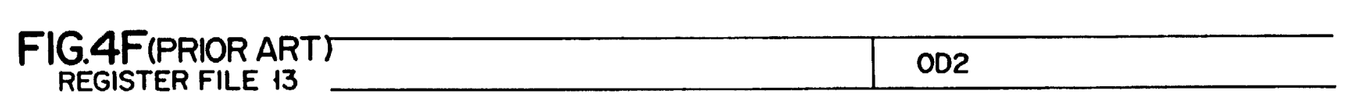
FIG. 4F shows the status of the register file having a next operand data value stored therein.

Similarly, an operand B address is supplied to the data memory 3 to obtain an operand B. Therefore, the bit/numerical computation processor 17 performs a numerical computation of the operands A and B. Furthermore, the bit/numerical computation processor 17 writes the numerical computation result at an operand C address. The above-mentioned processing is shown in the timing charts of FIGS. 4A through 4F. FIG. 4B shows a processing content. As shown in FIG. 4B, read access of an operand address (OA1), read access of operand data (OD1), incrementing of the instruction pointer (IP), read access of an operand address (OA2), read access of operand data (OD2), execution of an instruction, incrementing of the instruction pointer (IP), read access of an operand address (OA3), read access of operand data (OD3), and storage of a computation result are sequentially executed. As shown in FIG. 4B, an execution time of one numerical computation instruction corresponds to a total sum of an instruction fetch time, an operand data fetch time, and an instruction execution time. A time required for fetching an instruction or operand data is considerably longer than the instruction execution time. For this reason, the sequence instruction cannot be executed at high speed.

SUMMARY OF THE INVENTION

It is an object of the present invention to provide a programmable controller in which fetching of operand data from a data memory and fetching of an operand address of next operand data from a program memory are simultaneously performed to shorten a time required for fetching an instruction and operand data, and hence to allow high-speed execution of a sequence instruction.

In order to achieve the above object, a programmable controller of the present invention comprises: a program memory for storing a sequence instruction including at least bit computation instruction data and numerical computation instruction data and each comprising an instruction field and an operand field, and outputting instruction data corresponding to an input location address; a data memory for storing computation data, and outputting operand data corresponding to an input location address; a instruction pointer for supplying location address data to the program memory; a first address bus for connecting the instruction pointer and the program memory, and supplying the address data from the instruction pointer to the program memory; a holding register, connected between the program memory and the data memory, for holding at least the operand field of the instruction data output from the program memory; a first data bus for connecting the program memory and the holding register and supplying at least the operand field of the instruction data output from the program memory to the holding register; a second address bus for connecting the holding register and the data memory and supplying a content of the operand field held in the holding register to the data memory as location address data; an instruction decoder for decoding the instruction data supplied from the program memory and outputting a signal indicating a bit or numerical computation instruction; a bit computation processor for 1) supplying the content of the operand field held in the holding register to the data memory as the location address data to read the content of the corresponding location and execute the bit computation, and for 2) supplying the location address held in the instruction pointer to the program memory, for 3) instructing the holding register to latch the operand field of the next instruction data and for 4) instructing the instruction pointer to update its content, if the signal output from the instruction decoder is a signal indicating the bit computation instruction, and for outputting a start signal to numerical computation processor if the signal output from the instruction decoder is a signal indicating the numerical computation instruction, the operation of 1) and operations of 2) through 4) being parallelly performed; a numerical computation processor for 5) executing the numerical computation instruction data in response to the start signal from the bit computation processor, 6) supplying the operand field held in the holding register to read the contents of the corresponding location, 7) for supplying the location address held in the instruction pointer to the program memory, 8) for instructing the holding register to latch the operand address of the next instruction data, and for 9) instructing the instruction pointer to update its content, the operations of 5) and 6) and the operations of 7 through 9) being performed parallelly; and a second data bus for connecting the data memory and the bit and numerical computation processor and supplying data output from the data memory to the bit and numerical computation processor.

Figure 5:
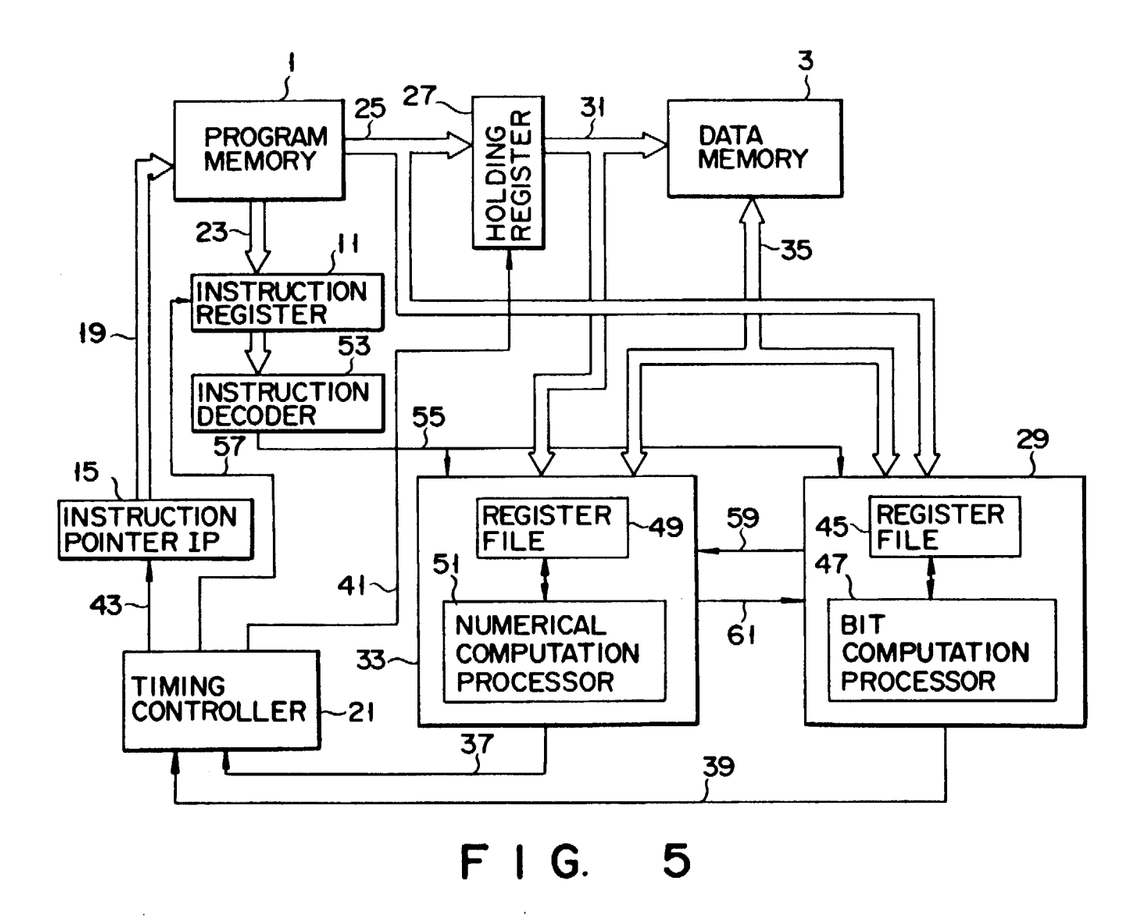
FIG. 5 is a block diagram showing an embodiment of a programmable controller according to the present invention.

According to the present invention, a program memory 1 and a data memory 3 are independently arranged, and a holding register 27 is arranged between the program memory 1 and the data memory 3. A portion between the program memory 1 and the holding register 27, a portion between the holding register 27 and the data memory 3, and a portion between the data memory 3, a bit computation unit 29, and a numerical computation unit 33 comprise independent buses 25, 31, and 35, respectively. For this reason, after an instruction field of an instruction data from the program memory 1 is latched by the instruction register, and the operand address output from the program memory 1 is latched by the holding register, the content of an instruction pointer 15 for the program memory 1 can be updated. As a result, the next instruction can be read from the start of the execution of the first instruction, and the operand address thereof can be held in the holding register, thereby enabling the operand into the register file. Accordingly, the read operation of the next instruction and the operand access operation of the current instruction can be performed parallelly, resulting in increased processing speed.

BRIEF DESCRIPTION OF THE DRAWINGS

FIG. 2 shows a content of a program memory shown in FIG. 1;

FIG. 3 shows a format when the content of the program memory shown in FIG. 2 is a numerical computation instruction;

DETAILED DESCRIPTION OF THE PREFERRED EMBODIMENTS

FIG. 5 is a block diagram showing an embodiment of a programmable controller according to the present invention. Note that the same reference numerals in FIG. 5 denote the same parts as in FIG. 1, and a detailed description thereof will be omitted.

A program memory 1 is connected to an instruction pointer 15 through a first address bus 19. The program memory 1 is also connected to an instruction register 11 through a third data bus 23, and to a holding register 27 and a bit computation unit 29 through a first data bus 25. The holding register 27 is connected to a data memory 3 and a numerical computation unit 33 through a second address bus 31. The data memory 3 is connected to the bit computation unit 29 and the numerical computation unit 33 through a second data bus 35. The bit computation unit 29 and the numerical computation unit 33 are connected to a timing controller 21 through control lines 39 and 37, respectively. The timing controller 21 is connected to the holding register 27, the instruction pointer 15, and the instruction register 11 through control lines 41, 43, and 57, respectively.

The instruction pointer 15 holds an address for addressing a location of the program memory 1, and increments the held address in response to a control signal from the timing controller 21. The program memory 1 outputs an instruction field (instruction code) of the content at the corresponding location onto the third data bus 23 and an operand field (operand address) onto the first data bus 25 in response to the address from the instruction pointer 15. In this embodiment, the program memory 1 stores a sequence instruction comprising a bit computation instruction code (ID1) and an operand address OA1 (OP1) at "address 1". Similarly, the memory 1 stores a sequence instruction comprising a bit computation instruction code ID2 and an operand address OA2 (OP2) at "address 2"; a sequence instruction comprising of a numerical computation instruction code ID3 and an instruction type (OP3) at "address 3"; a sequence instruction comprising an operand instruction code ID4 and an operand address OA4 (OP4) at "address 4"; a sequence instruction comprising an operand instruction code ID5 and an operand address OA5 (OP6) at "address 5"; a sequence instruction comprising an operand instruction code ID6 and an operand address OA6 (OP6) at "address 6"; a sequence instruction comprising a bit computation instruction code ID7 and an operand address OA7 (OP7) at "address 7"; a sequence instruction comprising a bit computation instruction code ID8 and an operand address OA8 (OP8) at "address 8"; a sequence instruction comprising a bit computation instruction code ID9 and an operand address OA9 (OP9) at "address 9"; a sequence instruction comprising a bit computation instruction code ID10 and an operand address OA10 (OP10) at "address 10"; and a sequence instruction comprising a bit computation instruction code ID11 and an operand address OA11 (OP11) at "address 11".

The program memory 1 outputs an instruction code of the sequence instruction stored at a location corresponding to the input address to the instruction register 11 through the third data bus 23, and supplies an operand address or an instruction type to the holding register 27 and the bit computation unit 29 through the first data bus 25.

The bit computation unit 29 comprises a register file 45 for holding data supplied through the first and second data buses 25 and 35, and a bit computation processor 47 for executing a bit computation instruction and outputting an increment instruction of the instruction pointer 15, a latch instruction of the holding register 27, and the latch instruction of the instruction register 11 to the timing controller 21. The numerical computation unit 33 comprises a register file 49 for holding data supplied through the second address bus 31 and the second data bus 35, and a numerical computation processor 51 for executing a numerical computation instruction and outputting an increment instruction of the instruction pointer 15 and a latch instruction of the holding register 27 to the timing controller 21.

The holding register 27 latches operand address or instruction type data output from the program memory 1 in response to a latch signal from the timing controller 21. The data memory 3 outputs operand data at a corresponding location to the register files 45 and 49 of the bit and numerical computation units 29 and 33 through the second data bus 35 in response to the operand address output from the holding register 27.

An instruction decoder 53 decodes an instruction code supplied from the instruction register 11, and supplies a signal representing a numerical or bit computation instruction code to the numerical and bit computation units 33 and 39 through a control line 55.

An operation of the embodiment of the present invention will be described below with reference to the timing charts of FIGS. 6A through 6M.

Figure 6A:
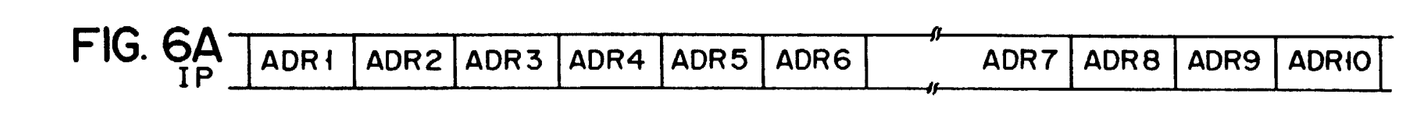
FIG. 6A shows the state of the instruction pointer with a first address value stored therein for the programmable controller of the instant invention.
Figure 6B:
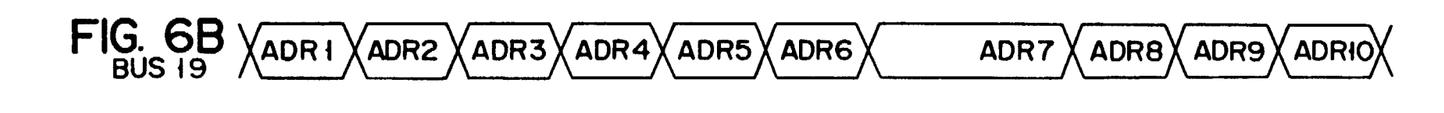
FIG. 6B shows the contents of first address bus 19 having the first address data value output into an initial memory location thereof.
Figure 6C:
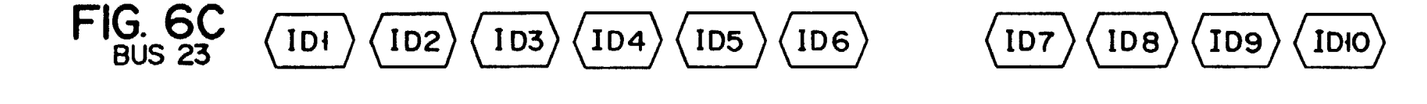
FIG. 6C shows the content of third data bus 23 having the instruction code ID1 corresponding to the first address located thereon.
Figure 6D:
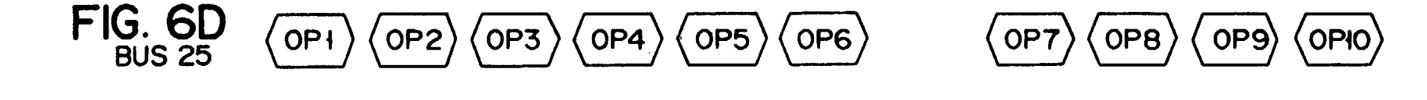
FIG. 6D shows the content of first data bus 25 having operand address OP1 located thereon.
Figure 6E:
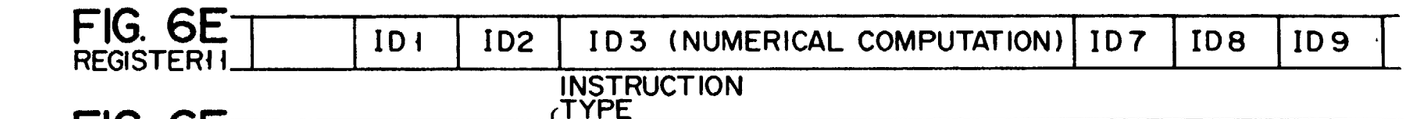
FIG. 6E shows the data storage state of register 11.
Figure 6F:
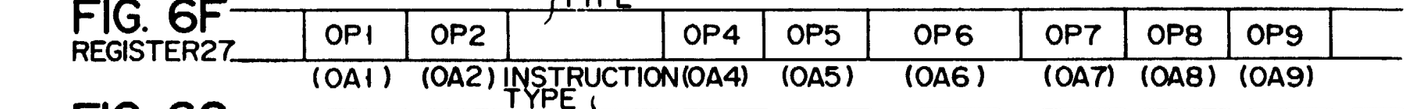
FIG. 6F shows the data storage state of register 27.

Assume that "address 1 (ADR1)" is initially set in the instruction pointer (IP) 15, as shown in FIG. 6A. In this case, "address 1 (ADR1)" is output onto the first address bus 19, as shown in FIG. 6B, and is supplied to the program memory 1. The program memory 1 outputs an instruction code (ID1) of a sequence instruction at a location corresponding to the "address 1" onto the third data bus 23, as shown in FIG. 6C, and outputs an operand address (OP1) onto the first data bus 25, as shown in FIG. 6D. In this case, since the latch signal is supplied from the timing controller 21 to the holding register 27 under the control of the bit computation unit 29, the operand address OP1 (OA1) is held in the holding register 27, as shown in FIG. 6F.

Figures 6G, 6H:
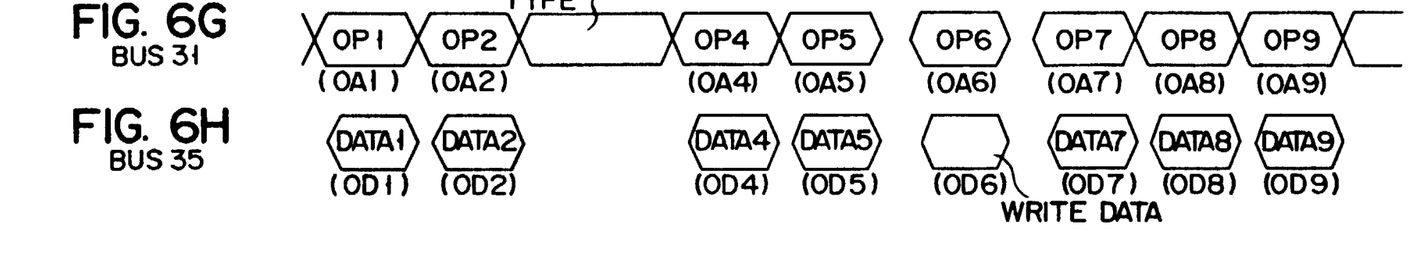
FIG. 6G shows the content of second address bus 31.
FIG. 6H shows the content of second data bus 35.
Figure 6I:
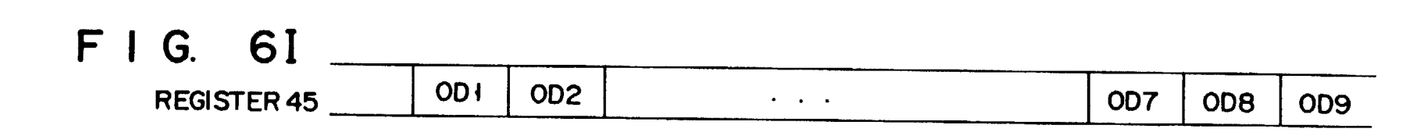
Figures 6J, 6K:
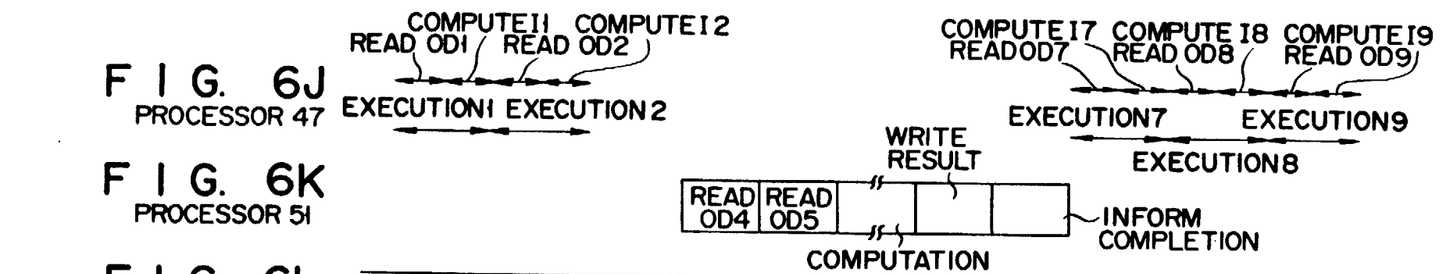
Figure 6L:
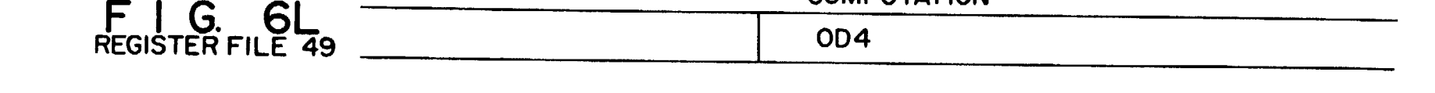
Figure 6M:
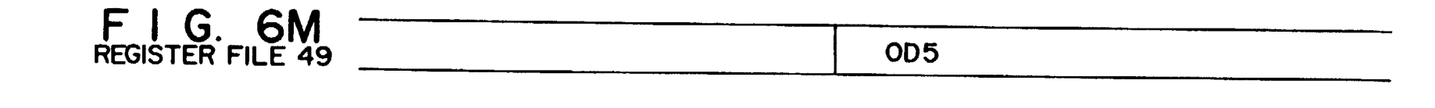

As a result, the first operand address (OA1) is output onto the second address bus 31, as shown in FIG. 6G, and is supplied to the data memory 3. The content (first operand OD1) at the location corresponding to the first operand address (OA1) is output from the data memory 3 onto the second data bus 35, as shown in FIG. 6H, and is supplied to the bit and numerical computation units 29 and 33. Therefore, the operand data OD1 is held in the register file 45 of the bit computation unit 29, as shown in FIG. 6I.

In this case, the bit computation unit 29 instructs the timing controller 21 through the control line 39 to cause the instruction register 11 to latch the instruction code (ID1) on the third data bus 23. As a result, the timing controller 21 supplies the latch signal to the instruction register 11 through the control line 57, and causes it to latch the instruction code (ID1). The bit computation unit 29 outputs an increment instruction of the instruction pointer 15 and a latch instruction of the holding register 27 to the timing controller 21. Then, as shown in FIG. 6A, the content of the instruction pointer 15 is updated to "address 2". As shown in FIG. 6B, "address 2 (ADR2)" is output onto the first address bus 19, and is supplied to the program memory 1. The program memory 1 outputs a bit computation instruction code ID2 and an operand address OA2 as the content of the "address 2 (ADR2)" onto the third and first data buses 23 and 25, respectively, as shown in FIGS. 6C and 6D.

On the other hand, the instruction decoder 53 decodes an instruction portion supplied from the instruction register 11, and supplies a signal representing a bit computation instruction code to the numerical and bit computation units 33 and 29 through the control line 55. The bit computation unit 29 detects that the sequence instruction read out from the program memory 1 is a bit computation instruction. The bit computation processor 47 executes a bit computation instruction (EXECUTE1), as shown in FIG. 6J. During this interval, as shown in FIG. 6F, the operand address OA2 is held in the holding register 27, and is supplied to the data memory 3 through the second address bus 31. Thus, operand data OD2 is output from the data memory 3 onto the second data bus 35. As a result, as shown in FIGS. 6I and 6J, upon completion of execution of the bit computation instruction ID1, the register file 45 starts to fetch the operand data OD2.

As described above, the timing controller 21 outputs the latch signal to the instruction register 11, an increment signal to the instruction pointer 15, and the latch signal to the holding register 27 under the control of the bit computation unit 29. As shown in FIGS. 6A through 6J, read access of the next instruction and operand is performed parallel to execution of the second instruction (ID2).

Figure 7:
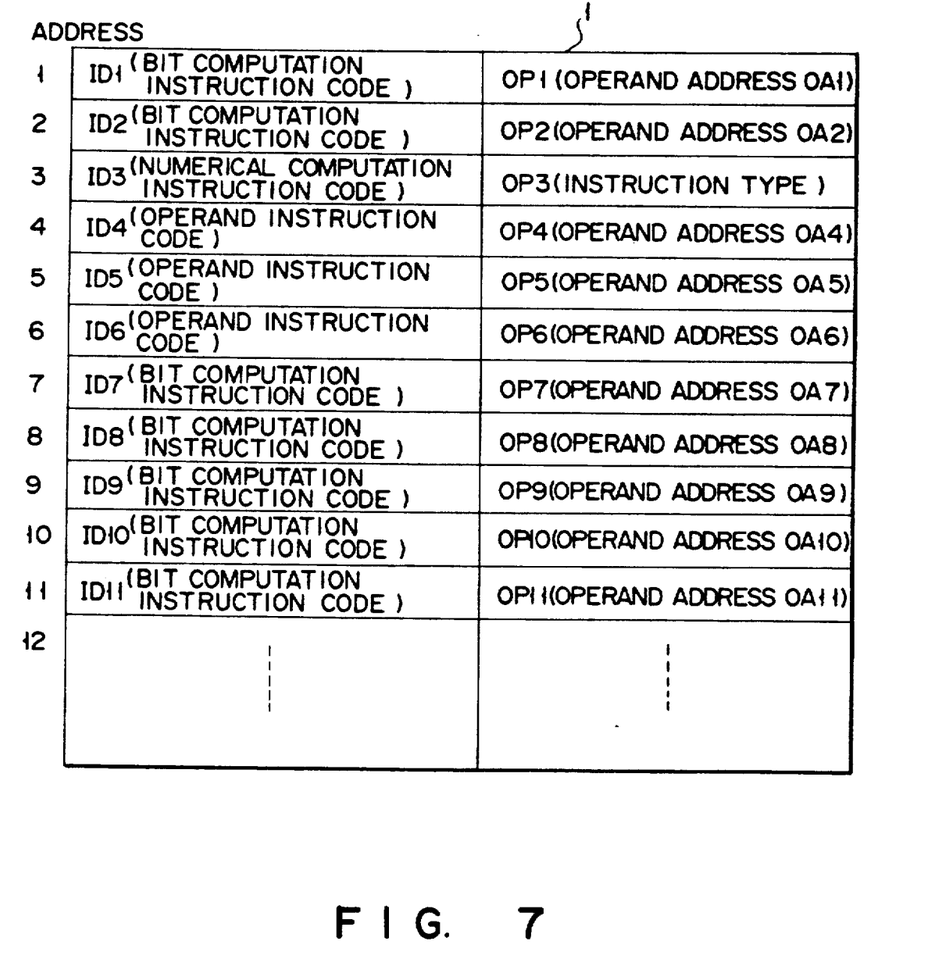
FIG. 7 shows a storage content of a program memory in the embodiment shown in FIG. 5.

In this embodiment, as shown in FIG. 7, a numerical computation instruction is stored at "address 3" of the program memory 1. In this case, the program memory 1 outputs an instruction type (OP3) to the holding register 27, as shown in FIG. 6F, and outputs a numerical computation instruction code (ID3) to the instruction register 11, as shown in FIG. 6E. The instruction decoder 53 supplies a signal representing the numerical computation instruction to the bit and numerical computation units 29 and 33. Since the fetched instruction is the numerical computation instruction, the bit computation unit 29 supplies a start signal to the numerical computation processor 51 through a control line 59, as shown in FIG. 6J.

The numerical computation processor 51 recognizes the instruction type supplied from the holding register 27 through the second address bus 31. And as shown in FIG. 6D, the processor 51 instructs the holding register 27 to latch the data on the first data bus 25 and instructs the instruction pointer 15 to be incremented.

Then, the numerical computation processor 51 reads operand data OD4 output onto the second data bus 35, as shown in FIG. 6H, in response to the start signal from the bit computation unit 29. During the read access of the operand data OD4, the contents of the instruction pointer 15 which has already been incremented is supplied to program memory 1, as described above, and the contents (operand instruction code ID5 and operand address OA5) at "address 5" of the program memory 1 are output to the instruction register 11 and the operand address OA5 is held in the holding register 27. Therefore, operand data OD5 is output from the data memory 3 onto the data bus 35. Therefore, as shown in FIG. 6K, the numerical computation processor 51 reads the operand data OD5. As shown in FIGS. 6L and 6M, first and second registers of the register file 49 of the numerical computation unit 33 are loaded with operand data OD4 and OD5, respectively.

The numerical computation processor 51 instructs the timing controller 21 to increment the instruction pointer 15 and to output the latch signal to the holding register 27. Thereafter, the numerical computation processor 51 performs a computation of an instruction type (e.g., addition, subtraction, or the like) of the operand data OD4 and OD5, as shown in FIG. 6K. Since an operand address OA6 corresponding to "address 6" of the program memory 1 is set in the holding register 27 during this interval (FIG. 6G), the numerical computation processor 51 writes the computation result at the operand address OA6 of the data memory 3. Finally, the numerical computation processor 51 outputs a computation completion acknowledge signal to the bit computation processor 47 through a control line 61 (FIG. 6K).

In response to the acknowledge signal, the bit computation processor 47 executes a bit computation instruction after "address 7" stored in the program memory 1 at the above-mentioned timing in response to a signal representing a bit computation from the instruction decoder 53.

Figure 8:
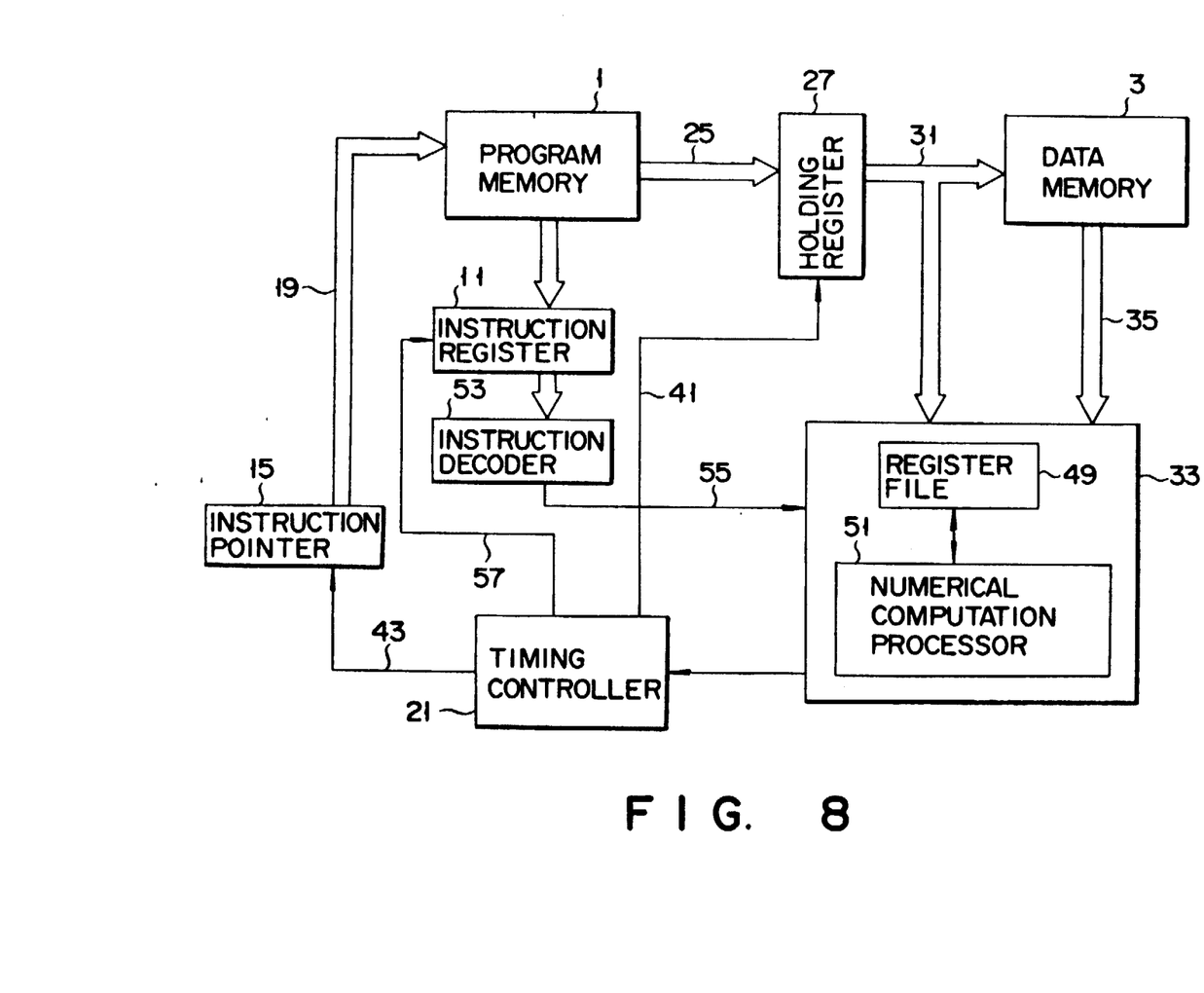
FIG. 8 is a block diagram showing another embodiment of the present invention.

FIG. 8 is a block diagram showing another embodiment of the present invention. The same reference numerals in FIG. 8 denote the same parts as in FIG. 5, and a detailed description thereof will be omitted.

The embodiment shown in FIG. 5 exemplifies a programmable controller wherein dedicated processors perform bit and numerical computations, respectively. The embodiment shown in FIG. 8 exemplifies a programmable controller wherein the numerical computation processor performs both the bit and numerical computations. The operation of this embodiment is the same as that of the numerical computation processor 51 in the embodiment shown in FIG. 5, and a detailed description thereof will be omitted. That is, the present invention can be applied to any type of programmable controller regardless of the type of application and the scale of the programmable controller, e.g., the number and functions of processors.

Figure 9:
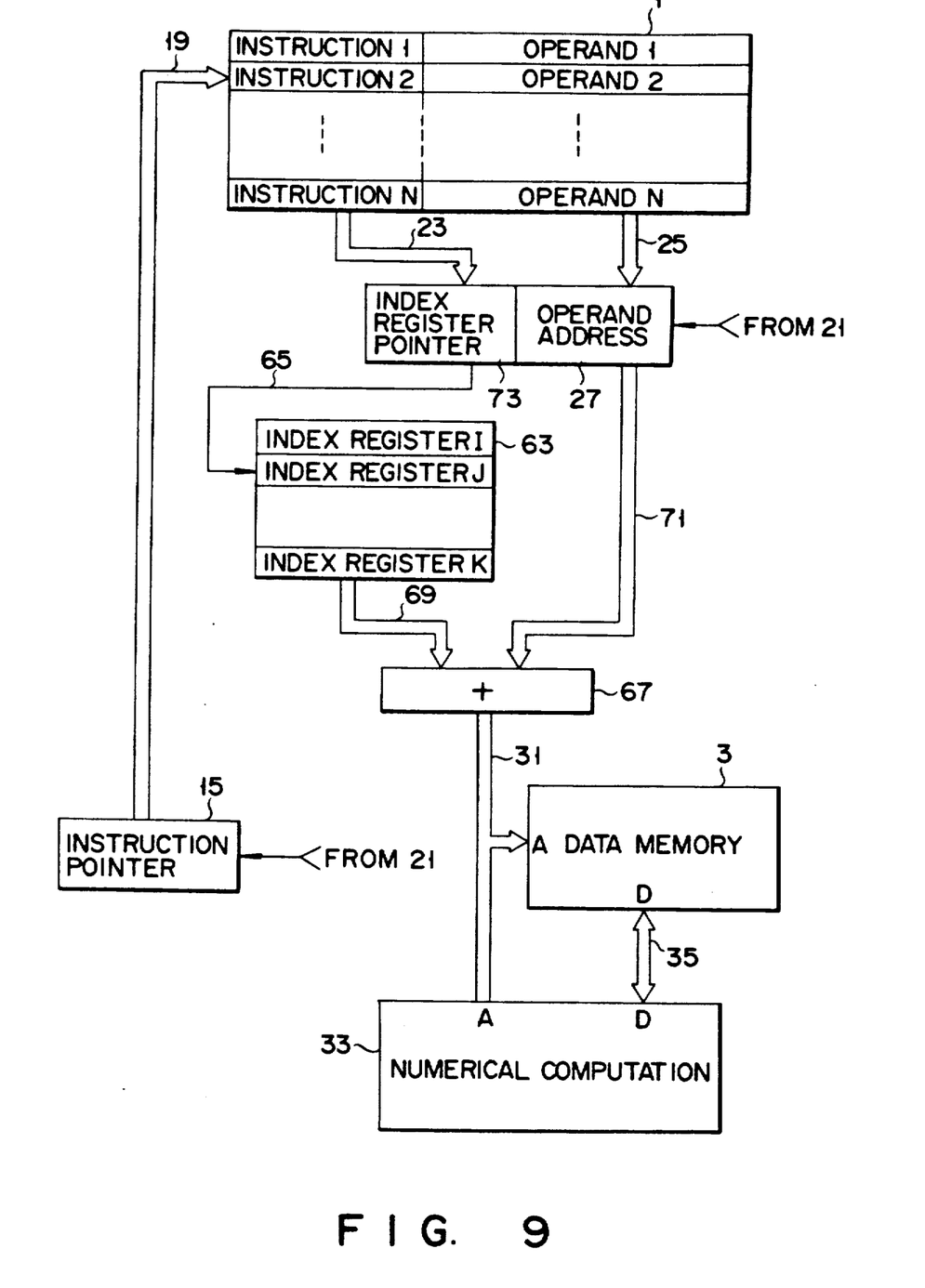
FIG. 9 is a block diagram showing still another embodiment of the present invention.

FIG. 9 is a block diagram showing still another embodiment of the present invention. In this embodiment, an operand address held in a holding register 27 is index-modified, and a data memory 3 is accessed using the index-modified address. Note that the same reference numerals in FIG. 9 denote the same parts as in the embodiment shown in FIG. 5, and a detailed description thereof will be omitted. In this case, an index pointer field 73 is provided to an instruction field of a sequence instruction. An index register pointer and an operand address read out from a program memory 1 are output to the holding register 27. The index register pointer set in the holding register 27 is supplied to an index register file 63 through a control line 65, and a designated index register is selected. As a result, the content of the selected index register is supplied to an adder 67 through a bus 69, and the operand address from the holding register 27 is supplied to the adder 67 through a bus 71.

The adder 67 adds these addresses, and supplies the sum as an address to the data memory 3 through a bus 31.

With this arrangement, the programmable controller can have an operand data addressing function without impairing high-speed numerical computation performance, and can be used in a wide application range.

What is claimed is:

1. A programmable controller comprising:
   program memory means for storing a sequence instruction including at least bit computation instruction data and numerical computation instruction data and each consisting of an instruction field and an operand field, and outputting instruction data corresponding to an input location address;
   data memory means for storing computation data, and outputting operand data corresponding to an input location address;
   instruction pointer means for supplying location address data to said program memory means;
   first address bus means for connecting said instruction pointer means and said program memory means, and supplying the address data from said instruction pointer means to said program memory means;
   holding register means, connected between said program memory means and said data memory means, for holding at least the operand field of the instruction data output from said program memory means;
   first data bus means for connecting said program memory means and said holding register means and supplying at least the operand field of the instruction data output from said program memory means to said holding register means;
   second address bus means for connecting said holding register means and said data memory means and supplying a content of the operand field held in said holding register means to said data memory means as location address data;
   instruction decoder means for decoding the instruction data supplied from said program memory means and outputting a signal indicating a bit or numerical computation instruction;

bit computation processor means for 1) supplying the content of the operand field held in the holding register means to the data memory means as the location address data to read the content of the corresponding location and execute the bit computation, and for 2) supplying the location address held in the instruction pointer means to the program memory means, for 3) instructing the holding register to latch the operand field of the next instruction data and for 4) instructing the instruction pointer means to update its content, if the signal output from the instruction decoder means is a signal indicating the bit computation instruction, and for outputting a start signal to numerical computation processor means if the signal output from the instruction decoder means is a signal indicating the numerical computation instruction means, the operation of 1) and operations of 2) through 4) being parallelly performed;

numerical computation processor means for 5) executing the numerical computation instruction data in response to the start signal from the bit computation processor means, 6) supplying the operand field held in the holding register means to read the contents of the corresponding location, 7) for supplying the location address held in the instruction pointer means to the program memory means, 8) for instructing the holding register means to latch the operand address of the next instruction data, and for 9) instructing the instruction pointer means to update its content, the operations of 5) and 6) and the operations of 7 through 9) being performed parallelly; and second data bus means for connecting said data memory means and said bit and numerical computation processor means and supplying data output from said data memory means to said bit and numerical computation processor means.

2. A programmable controller comprising:

a bit computation processor means;

program memory means for storing a sequence instruction including at least bit computation instruction data and numerical computation instruction data and each consisting of an instruction field and an operand field, and outputting instruction data corresponding to an input location address;

data memory means for storing computation data, and outputting operand data corresponding to an input location address;

instruction pointer means for supplying location address data to said program memory means, and supplying the address data from said instruction pointer means to said program memory means;

holding register means, connected between said program memory means and said data memory means, for holding at least the operand field of the instruction data output from said program memory means;

first data bus means for connecting said program memory means and said holding register means and supplying at least the operand field of the instruction data output from said program memory means to said holding register means;

second address bus means for connecting said holding register means and said data memory means and supplying a content of the operand field held in said holding register means to said data memory means as location address data;

instruction decoder means for decoding the instruction data supplied from said program memory means and outputting a signal indicating a bit or numerical computation instruction;

numerical computation processor means for 1) executing the numerical computation instruction data in response to a start signal from said bit computation processor means, 2) supplying the operand field held in the holding register means to read the contents of the corresponding location in said data memory, 3) for supplying the location address held in the instruction pointer means to the program memory means, 4) for instructing the holding register means to latch the operand address of the next instruction data, and for 5) instructing the instruction pointer means to update its content, the operations of 1) and 2) and the operations of 3 through 5) being performed simultaneously;

second data bus means for connecting said data memory means and said numerical computation processor means and supplying data output from said data memory means to said numerical computation processor means;

first connection means for connecting said instruction decoder means between said Program memory means and said numerical computation processor means; and second connection means for connecting said instruction pointer means to said numerical computation processor means;

wherein fetching of said operand data from said data memory means and fetching of said operand addresses of next operand data from said program memory are simultaneously performed.

3. A programmable controller according to claim 1, further comprising:

index register file means for storing a plurality of index data for performing index modification;

index register pointer storage means for storing an index register pointer for designating a specific index register of said index register file means;

adder means for adding a content of an index register designated by the index register pointer stored in said index register pointer storage means and a content of the operand field stored in said holding register means; and means for supplying the sum from said adder means to said data memory means as a location address of said data memory means.

4. A programmable controller according to claim 2, further comprising:

index register file means for storing a plurality of index data for performing index modification;

index register pointer storage means, coupled between said program memory means and said index register file means, for storing an index register pointer for designating a specific index register of said index register file means;

adder means, coupled between said index register file means and said numerical computation processor means, for adding a content of an index register designated by the index register pointer stored in said index register pointer storage means and a content of the operand field stored in said holding register means; and means for supplying the sum from said adder means to said data memory means as a location address of said data memory means.

5. A programmable controller comprising:

program memory means for storing a sequence instruction including at least bit computation instruction data and numerical computation instruction data and each consisting of an instruction field and an operand field, and outputting instruction data corresponding to an input location address;

data memory means for storing computation data, and outputting operand data corresponding to an input location address;

instruction pointer means for supplying location address data to said program memory means;

first address bus means for connecting said instruction pointer means and said program memory means, and supplying the address data from said instruction pointer means to said program memory means;

holding register means, connected between said program memory means and said data memory means, for holding at least the operand field of the instruction data output from said program memory means;

first data bus means for connecting said program memory means and said holding register means and supplying at least the operand field of the instruction data output from said program memory means to said holding register means;

second address bus means for connecting said holding register means and said data memory means and supplying a content of the operand field held in said holding register means to said data memory means as location address data;

instruction data register means for holding the instruction field of the instruction data output from said program memory means;

third data bus means for connecting said program memory means and said instruction data register means and supplying the instruction field output from said program memory means to said instruction data register means;

instruction decoder means for decoding the instruction field supplied from said instruction data register means and outputting a signal indicating a bit or numerical computation instruction;

first and second register file means for holding data output from the data memory means;

bit computation processor means for 1) supplying the content of the operand field held in the holding register means to the data memory means as the location address data to read the content of the corresponding location and execute the bit computation, and for 2) supplying the location address held in the instruction pointer means to the program memory means, for 3) instructing the holding register to latch the operand field of the next instruction data and for 4) instructing the instruction pointer means to update its content, if the signal output from the instruction decoder means is a signal indicating the bit computation instruction, and for outputting a start signal to numerical computation processor means if the signal output from the instruction decoder means is a signal indicating the numerical computation instruction means, the operation of 1) and operations of 2) through 4) being parallelly performed;

numerical computation processor means for 5) executing the numerical computation instruction data in response to the start signal from the bit computation processor means, 6) supplying the operand field held in the holding register means to read the contents of the corresponding location, 7) for supplying the location address held in the instruction pointer means to the program memory means, 8) for instructing the holding register means to latch the operand address of the next instruction data, and for 9) instructing the instruction pointer means to update its content, the operations of 5) and 6) and the operations of 7 through 9) being performed parallelly; and second data bus means for connecting said data memory means and said bit and numerical computation processor means and supplying data output from said data memory means to said bit and numerical computation processor means.

6. A programmable controller according to claim 5, further comprising:

index register file means for storing a plurality of index data for performing index modification;

index register pointer storage means for storing an index register point for designating a specific index register of said index register file means;

adder means for adding a content of an index register designated by the index register pointer stored in said index register pointer storage means and a content of the operand field stored in said holding register means; and means for supplying the sum from said adder means to said data memory means as a location address of said data memory means.

7. A programmable controller comprising:

a bit computation processor means;

program memory means for storing a sequence instruction including at least bit computation instruction data and numerical computation instruction data and each consisting of an instruction field and an operand field, and outputting instruction data corresponding to an input location address;

data memory means for storing computation data, and outputting operand data corresponding to an input location address; instruction pointer means for supplying location address data to said program memory means;

first address bus means for connecting said instruction pointer means and said program memory means, and supplying the address data from said instruction pointer means to said program memory means;

holding register means, connected between said program memory means and said data memory means, for holding at least the operand field of the instruction data output from said program memory means;

first data bus means for connecting said program memory means and said holding register means and supplying at least the operand field of the instruction data output from said program memory means to said holding register means;

second address bus means for connecting said holding register means and said data memory means and supplying a content of the operand field held in said holding register means to said data memory means as location address data;

instruction register means for holding the instruction field output from said program memory means;

third data bus means for connecting said program memory means and said instruction register means and supplying the instruction field output from said program memory means to said instruction register means;

instruction decoder means, coupled to said instruction register means, for decoding the instruction field supplied from said instruction register means and outputting a signal indicating a bit or numerical computation instruction;

register file means for holding data output from the data memory means;

numerical computation processor means for 1) executing the numerical computation instruction data in response to a start signal from said bit computation processor means, 2) supplying the operand field held in the holding register means to read the contents of the corresponding location in said data memory, 3) for supplying the location address held in the instruction pointer means to the program memory means, 4) for instructing the holding register means to latch the operand address of the next instruction data, and for 5) instructing the instruction pointer means to update its content, the operations of 1) and 2) and the operations of 3 through 5) being performed simultaneously;

second data bus means for connecting said data memory means and said numerical computation processor means through said register file means, and supplying data output from said data memory means to said numerical computation processor means;

first connection means for connecting said instruction decoder means to said numerical computation processor; and second connection means for connecting said instruction pointer means to said numerical computation processor means;

wherein fetching of said operand data from said data memory and fetching of said operand addresses of next operand data from said program memory are simultaneously performed.

8. A programmable controller according to claim 6, further comprising:

index register file means for storing a plurality of index data for performing index modification;

index register pointer storage means, coupled between said program memory means and said index register file means, for storing an index register pointer for designating a specific index register of said index register file means;

adder means, coupled between said index register file means and said numerical computation processor means, for adding a content of an index register designated by the index register pointer stored in said index register pointer storage means and a content of the operand field stored in said holding register means; and means for supplying the sum from said adder means to said data memory means as a location address of said data memory means.

* * * * *